United States Patent [19]

Nomura

[11] Patent Number: 4,667,776
[45] Date of Patent: May 26, 1987

[54] CONTROL APPARATUS FOR A-C ELEVATOR

[75] Inventor: Masami Nomura, Inazawa, Japan

[73] Assignee: Mitsubishi Denki Kabushiki Kaisha, Tokyo, Japan

[21] Appl. No.: 856,364

[22] Filed: Apr. 28, 1986

[30] Foreign Application Priority Data

Apr. 30, 1985 [JP] Japan .................................. 60-92660
Jun. 13, 1985 [JP] Japan ................................ 60-128671

[51] Int. Cl.⁴ .............................................. B66B 1/32
[52] U.S. Cl. ................................... 187/105; 318/759; 187/112
[58] Field of Search ............... 187/29 R; 318/52, 370, 318/371, 375, 376, 379, 380, 757, 759, 808; 340/19, 20, 21

[56] References Cited

U.S. PATENT DOCUMENTS 4,475,631 10/1984 Nomura ........................ 318/759 X
4,483,419 11/1984 Salihi et al. ....................... 187/29 R Primary Examiner—William M. Shoop, Jr.
Assistant Examiner—Richard K. Blum
Attorney, Agent, or Firm—Leydig, Voit & Mayer

[57] ABSTRACT

In a case where a braking torque is required as in the slowdown mode of the cage of an elevator, regenerative power within a range within which the generation of heat by a motor is permissible is consumed in the motor, and excess regenerative power is consumed by a regeneration resistor, so that a control apparatus can be made smaller in size.

A braking torque is controlled in such a way that when a braking torque command is not greater than a predetermined value, only the magnitude of current is controlled with a slip fixed, and that when the braking torque command has exceeded the predetermined value, the slip is decreased without increasing the magnitude of the current.

Regenerative power is partly fed back to a D-C side. Since, however, the current is suppressed within a predetermined value, so that the current capacity of an inverter can be restrained and that the resistor for consuming the regenerative power on the D-C side does not increase considerably. Moreover, since the power to be consumed in the motor decreases, the heat generation of the motor can be suppressed. Thus, a system with a thermal balance considered as a whole can be constructed.

3 Claims, 9 Drawing Figures

CONTROL APPARATUS FOR A-C ELEVATOR

BACKGROUND OF THE INVENTION

This invention relates to improvements in a control apparatus for an A-C elevator which controls the elevator to be driven by an induction motor.

A system which employs an induction motor as an electric motor for driving the cage of an elevator, wherein the motor is subjected to a slip frequency control, whereby the torque of the motor is controlled so as to run the cage is illustrated in FIGS. 5 and 6.

In FIG. 5, numeral 1 designates a three-phase A-C power source terminal, numeral 2 an electromagnetic contactor contact which is connected to the terminal 1 and which is closed when starting a cage 11 to be described later and is opened when stopping it, and numeral 3 a converter which is constructed of a rectifier circuit for rectifying a three-phase A-C voltage into direct current through the contact 2. Numeral 4 indicates a smoothing capacitor which is connected to the D-C side of the converter 3, numeral 5 a resistor which has one end thereof connected to one end of the smoothing capacitor 4, and numeral 6 a transistor which is connected to the other end of the resistor 5 and the other end of the smoothing capacitor 4. An inverter 7 well known as a pulse width modulation system is connected to both the ends of the smoothing capacitor 4, is constructed of transistors and diodes, and inverts a fixed D-C voltage into alternating current of any desired voltage and any desired frequency. A three-phase induction motor 8 is driven by the inverter 7, a driving sheave 9 for a hoist is driven by the motor 8, a main rope 10 is wound round the sheave 9, the cage 11 and a counterweight 12 are respectively coupled to both the ends of the main rope 10, and a tachometer generator 13 is coupled to the motor 8 and produces a speed signal 13a indicative of the rotational speed of the motor 8. Shown at numeral 14 is a speed command signal. An adder 15 outputs the deviation signal between the speed command signal 14 and the speed signal 13a. Numeral 16 indicates a compensation element which is connected to the adder 15 in order to better the response of a speed control loop, and which has a transfer function G(s). Shown at symbol 16a is a slip frequency command signal which is the output of the compensation element 16. An adder 17 outputs the added value between the slip frequency command signal 16a and the speed signal 13a. A voltage command generator 18 produces a voltage command signal 18a on the basis of the output of the adder 17, and a frequency command generator 19 similarly produces a frequency command signal 19a. An inverter control device 20 controls the output voltage and output frequency of the inverter 7 on the basis of the voltage command signal 18a and the frequency command signal 19a.

In such an arrangement, the compensation element 16 outputs the slip frequency command signal 16a which corresponds to the deviation between the speed command signal 14 and the speed signal 13a. This slip frequency command signal 16a corresponds to a torque command signal, and the speed signal 13a is added thereto by the adder 17, whereby the voltage command signal 18a and the frequency command signal 19a are determined so as to satisfy the relationship in which the ratio of a voltage/ a frequency becomes substantially constant. Using these command values, the control device 20 performs the switching control of the elements of the inverter 7 (also those of the converter 3 in some cases when the converter 3 is constructed of thyristors or the likes) and causes the motor 8 to generate the torque corresponding to the slip frequency command signal 16a. In this way, the motor 8 is started to run the cage 11, the speed of which is automatically controlled at high precision.

FIG. 6 shows the curve 21 of the torque versus the rotational speed of the motor 8. Here, $n_O$ denotes a synchrongus speed, which is an operating point in the case where the motor 8 rotates at a rotational speed corresponding to the output frequency of the inverter 7. In general, an induction machine produces near the synchrongus speed $n_O$ a torque proportional to a slip frequency (corresponding to, for example, $n_O-n_1$ or $n_O-n_2$). Accordingly, when the magnitude $n_O-n_1$ corresponding to (slip x frequency) is controlled, the torque can be controlled.

In case of the elevator, however, when the cage 11 is to be run down with a heavy load and at a fixed speed for the purpose of the slowdown stoppage thereof, the motor 8 needs to generate a braking force. In the illustration of FIG. 6, this corresponds to a case where a required braking torque is $T_2$. In this case, the rotational speed $n_2$ of the motor 8 becomes higher than the synchrongus speed $n_O$. In such an operation, mechanical energy is converted into electrical energy through the motor 8, and regenerative power is returned to the D-C side through the inverter 7. Therefore, a D-C side voltage rises and might destroy the elements within the inverter 7. The resistor 5 protects the elements against this voltage, namely, the regenerative power is consumed in the resistor 5 owing to the turngn of the transistor 6. There is also a system wherein the resistor 5 is replaced with an inverter for regeneration, which returns the regenerative power to the power source side.

In any case, however, a device for processing the regenerative power becomes expensive, and the control apparatus becomes large in size.

Intended to solve this disadvantage is a method wherein regenerative power is consumed within a motor as disclosed in the official gazettes of Japanese Patent Applications Laid-open No. 59-17879 and No. 58-36866.

More specifically, referring to FIG. 7, numeral 101 designates a rectifier which converts alternating current into direct current, numeral 102 a capacitor which smooths the direct current, numeral 103 a well-known inverter device of the pulse width modulation system which switches D-C power by means of transistors and inverts it into an A-C output of variable voltage and variable frequency, numeral 104 an induction motor which is driven by the inverter 103, numeral 105 a driving sheave for a hoist which is driven by the motor 104, numeral 106 a main rope which is wound round the sheave 105, and numerals 107 and 108 a cage and a counterweight which are respectively coupled to both the ends of the main rope 106.

Further, numeral 109 indicates a tachometer generator which is coupled to the induction motor 104 and which produces an actual angular velocity signal $\omega_r$ indicative of the rotational speed of the motor, numera 110 a speed control calculation device which generates a torque command T* on the basis of the difference between an angular velocity command signal $\omega_p$ and the actual angular velocity signal $\omega_r$, numeral 111 a frequency calculation device which calculates a feed frequency so that regenerative power may be entirely consumed within the motor 104 when the motor is to generate a braking torque, numeral 112 a current value calculation device which calculates the magnitude of a required current I* on the basis of the torque command T* (in this case, the braking torque) from the speed control calculation device 110, numeral 113 a current command generator which calculates the instantaneous value commands $i_u^*$, $i_v^*$ and $i_w^*$ of the currents of respective phases on the basis of the magnitude of the current I* and the calculated frequency value $\omega^*$, and numeral 114 a pulse width modulation (hereinbelow, termed "PWM") switching circuit which compares the current commands with actual currents detected by a current detector 115 and which brings the actual currents closer to the command values. The current detector 115 detects the currents of the two phases of the U-phase and the V-phase, and the current of the W-phase is obtained as the difference between the detected currents.

Next, before the description of the operation of the prior-art example, the principle of this prior-art example will be elucidated with reference to FIGS. 8 and 9. FIG. 8 shows a simplified equivalent circuit for a single phase with note taken of only resistance components within the induction motor, while FIG. 9 graphically shows electric power generated by the motor and electric power consumed within the motor, versus a slip evaluated from the equivalent circuit. Referring to these figures, a condition for fully consuming regenerative power within the motor is to satisfy the following equations:

$$(r_1 + r_2)I^2 + \frac{1-S}{S} r_2 I^2 = 0 \quad (1)$$

$$\therefore S = -\frac{r_2}{r_1} \quad (2)$$

Here, $r_1$ and $r_2$ indicates the primary and secondary resistance components of the motor respectively, and S the slip thereof. That is, when the slip meets Eq. (2), the regenerative power is entirely consumed within the motor, and when the slip becomes greater than the magnitude (i.e. becomes smaller in the absolute value thereof), electric power is returned to the D.C. side. On the other hand, the torque T is expressed by:

$$T = \frac{1}{\omega_r} \cdot \frac{1-S}{S} r_2 I^2 \quad (3)$$

Since $\omega_r = \omega(1 - S)$, $$T = \frac{r_2}{\omega S} I^2 \quad (4)$$

Here, $\omega_r$ indicates the actual rotational angular velocity of the motor, and $\omega$ the drive frequency thereof. As seen from Eq. (4), when the slip S satisfies Eq. (2) and assumes the constant value, the torque T is proportional to the square of the current I and is inversely proportional to the drive frequency.

On the basis of these conditions, in the arrangement of FIG. 7, the motor 104 shall be braked when the torque command T* which is output from the speed control calculation device 110 on the basis of the difference between the actual angular velocity $\omega_r$ and the ideal angular velocity command $\omega_p$ of the motor corresponding to the ideal speed curve of the elevator has become a braking torque command. Naturally, these operations are executed also through the calculation of $S/\omega$ by a microcomputer or the like. In this case, the change-over from the power running to the braking can be readily effected by changing-over $S/\omega$ calculation methods depending upon the sign of the torque command T*.

Here, when the torque command T* has become the braking torque command, the magnitude of the current meeting Eq. (4) is evaluated by the current value calculation device 106. In addition, the frequency at which the slip fulfills Eq. (2) is generated by the frequency calculation device 111. The current magnitude and the frequency with which the motor 104 is driven so as to prevent the generation of the regenerative power while producing the necessary braking torque are evaluated by these calculations. Thereafter, the current command values of the respective phases are found by the current command generator 113, they are delivered to the PWM switching circuit 114 and compared with the actual currents therein, the outputs of the switching circuit operate the inverter 103, and currents are fed to the motor 104. Thus, the motor 104 runs the cage 107 in accordance with the ideal speed curve of the elevator while generating the necessary braking torque.

The prior-art apparatus adopts either of two methods wherein in generating the braking torque, the regenerative power is efficiently generated and is entirely consumed by a resistor (not shown) disposed on the D-C side or wherein the regenerative power is entirely consumed within the motor as described above. With the former method, the capacity of the resistor is large and the apparatus becomes expensive. On the other hand, the method by which the regenerative power is consumed within the motor needs to enlarge the absolute value of the slip. Accordingly, the current value becomes large as understood from Eq. (4), the current capacity of the inverter 103 increases, and the apparatus rather becomes expensive. Besides, when the electric power to be consumed within the motor is high, the motor produces much heat, so that the motor will be inevitably enlarged in size or will degrate earlier.

SUMMARY OF THE INVENTION

This invention has been made in order to solve the problems as described above according to this invention an apparatus can be made small in size and low in price in consideration of the thermal balance of the whole apparatus including a motor by suppressing an inverter current to or below a predetermined value to reduce the generation of heat by the motor and to lessen the capacity of a resistor for consuming regenerative power.

In the control apparatus for an A-C elevator according to this invention, when a braking torque is required as in the slowdown mode of a cage, the regenerative power is consumed in the motor within a range within which the heat production of the motor is permissible, and it is consumed by the resistor for the regenerative power beyond the range, so that the apparatus can be made smaller in size.

Further, according to this invention that when a braking torque command is not greater than a predetermined value, the slip of the motor is fixed, and only the magnitude of the current thereof is controlled, whereas when the braking torque command has exceeded the predetermined value, the slip is reduced without increasing the magnitude of the current, and the braking torque of the motor is controlled.

In this invention, the regenerative power is partially returned to a D-C side. Since, however, the current is suppressed within a predetermined value, the current capacity of an inverter can be restrained, and the capacity of a resistor for consuming the regenerative power on the D-C side does not become very large. Moreover, since the electric power to be consumed in the motor decreases, the production of heat by the motor can be suppressed. Thus, a system with a thermal balance considered as a whole can be constructed.

BRIEF DESCRIPTION OF THE DRAWINGS

FIGS. 2 and 3 elucidate the principle of this invention, in which FIG. 2 is an equivalent circuit diagram of a motor and FIG. 3 is a diagram of a slip characteristic curve.

DESCRIPTION OF THE PREFERRED EMBODIMENTS

Now, an embodiment of this invention will be described.

First, the principle of this invention will be explained.

Figure 2:
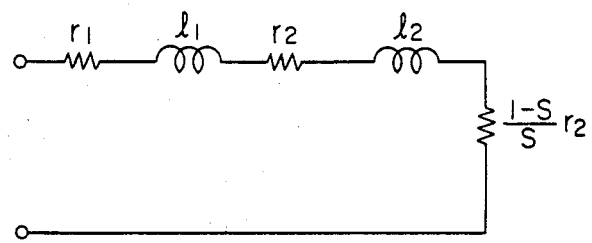

FIG. 2 shows the simplified equivalent circuit of a motor for briefly explaining this invention.

Here, a mechanical input $P_G$ in a regenerative running mode is indicated by an absolute value as follows, with a predetermined slip value $S'$ being $S' = -S$:

$$P_G = \left( \frac{1 + S'}{S'} \right) r_2 I^2 \quad (r_2: \text{secondary resistance}) \tag{5}$$

where $S' > 0$ holds in the regenerative running mode.

On the other hand, a loss $P_M$ which is consumed by coil resistances $r_1$ and $r_2$ ($r_1$ : primary resistance) within the motor is:

$$P_M = (r_1 + r_2) I^2 \tag{6}$$

Accordingly, electric power $P_R$ which is fed back to a D-C side and is consumed by a resistor for regeneration becomes:

$$P_R = P_G - P_M \tag{7}$$

Figure 3:
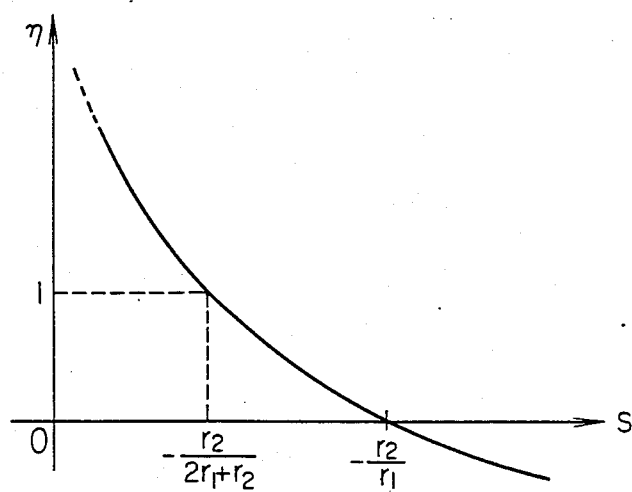

Here, the ratio $\eta$ between the power $P_R$ consumed by the resistor for regeneration and the power $P_M$ consumed in the motor becomes:

$$= \left( \frac{r_2}{S'} - r_1 \right) I^2$$

which is independent of the magnitude of current and is a function of only the slip. The relationship of the ratio $\eta$ to the slip $S$ becomes as shown in FIG. 3.

$$\eta = \frac{\frac{r_2}{S'} - r_1}{r_1 + r_2} \tag{8}$$

As seen from the figure, assuming $$S = -\frac{r_2}{r_1}$$

the component to be consumed by the regeneration resistor becomes zero, and hence, $\eta = 0$ holds.

In addition, assuming $$S = -\frac{r_2}{2r_1 + r_2}$$

$\eta = 1$ holds, that is, the power consumed by the motor and the power consumed by the regeneration resistor become substantially equal.

The illustration of FIG. 3 differs greatly from the actual situation in a region in which the absolute value of the slip S is sufficiently small, but it agrees well with the actual situation in a region in which the regenerative power is great.

This invention consists in selecting the slip S so that the production of heat by the motor may become a loss sufficiently allowed from the viewpoints of insulation and lifetime and that the remaining regenerative power may be consumed by the resistor, whereby the size of the resistor for consuming the regenerative power is minimized, and the heat production of the motor is confined within a permissible value.

Figure 1:
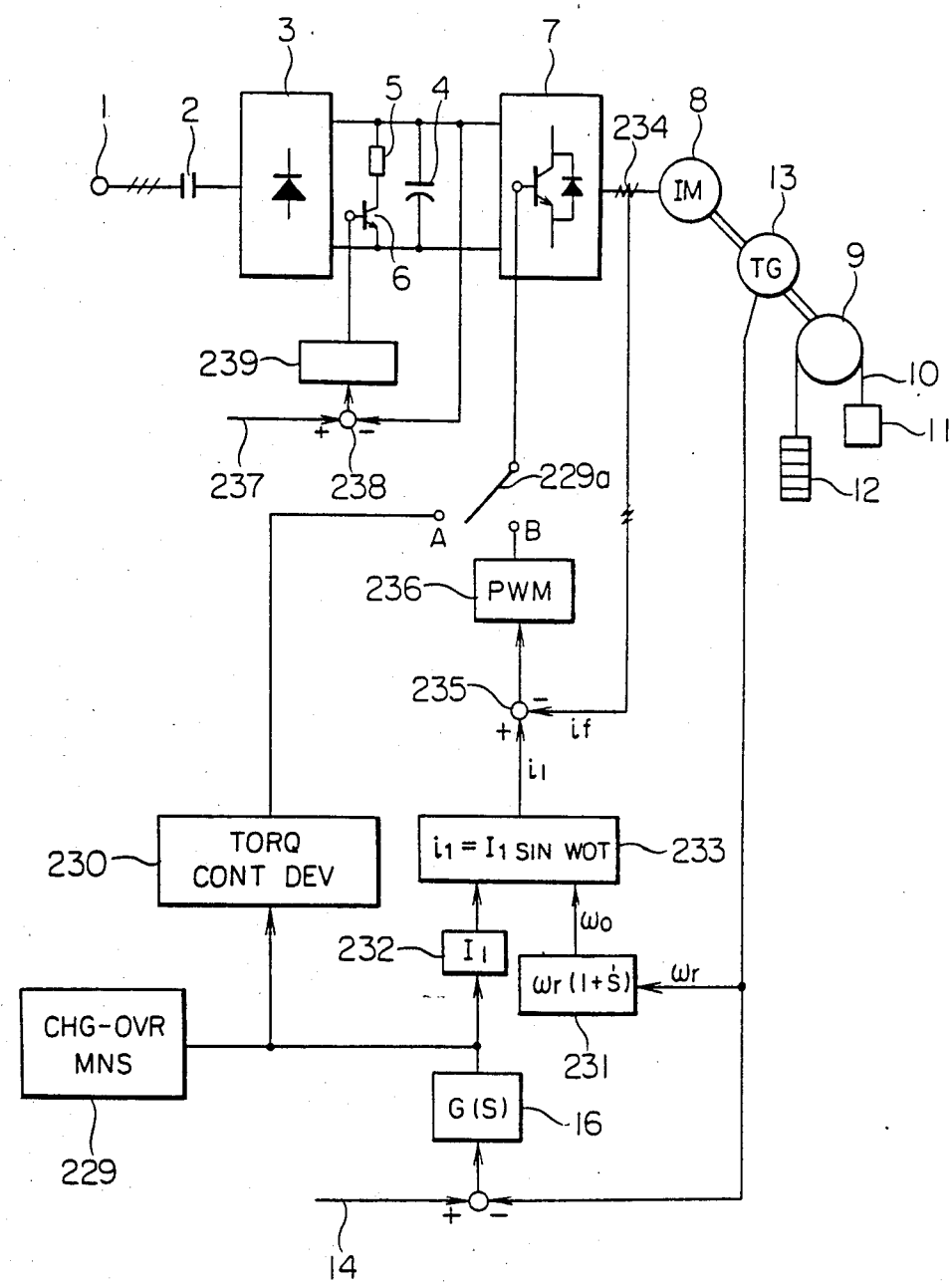
FIG. 1 is a block diagram showing a control apparatus for an A-C elevator according to an embodiment of this invention.
Figure 5:
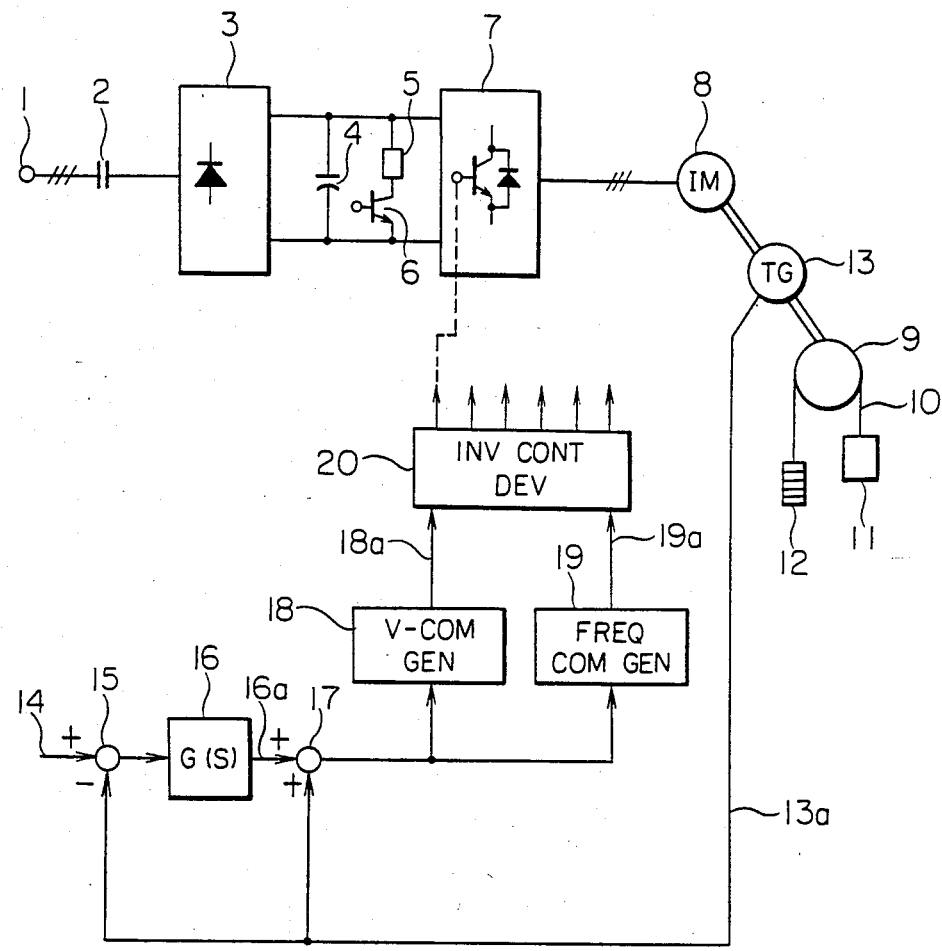
FIG. 5 is a block diagram of a prior-art example.
Figure 6:
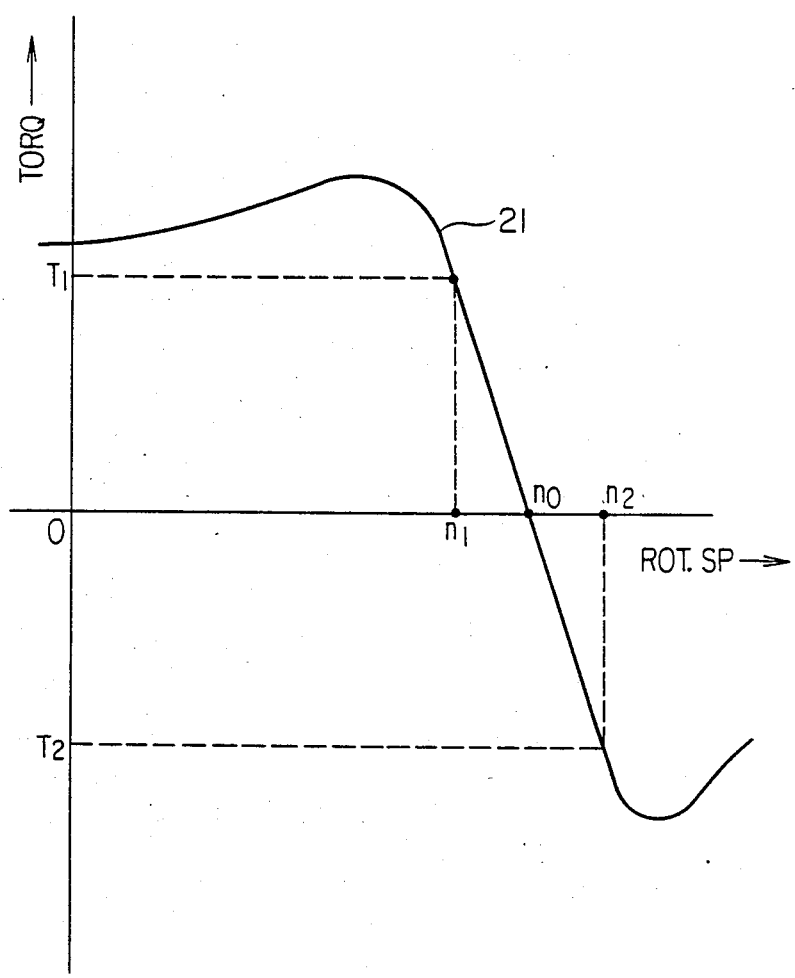
FIG. 6 is a diagram of the torque characteristic curve of a motor in FIG. 5.

A practicable embodiment of this invention is shown in FIG. 1. In the figure, the same portions as in FIG. 5 are indicated by identical symbols, and they shall be omitted from the description.

Referring to FIG. 1, numeral 229 designates changeover means to connect a switch 229a when a torque command is plus so as to control the inverter 7 by the use of a hitherto-known torque control device 230 and to changeover the switch to new control means when the torque command is minus. A frequency command circuit 231 determines the output frequency of the inverter 7 from the rotational frequency of the motor 8 so as to drive this motor with a predetermined slip $S'$ ($= -S$). A current value command circuit 232 determines the absolute value of a current from the torque command. A current command synthesis circuit 233 provides currents to be output from the inverter 7, as instantaneous values for the respective phases, on the basis of the absolute value of the current and the frequency. The command values are output as listed below.

R-Phase $I_{1R} = I_1 \sin \omega_o t$
S-Phase $I_{1S} = I_1 \sin (\omega_o t + \frac{2}{3}\pi)$
T-Phase $I_{1T} = I_1 \sin (\omega_{ot} + 4/3\pi)$ In addition, a current detector 234 detects the currents of the respective phases (the currents of the motor 8)

actually output from the inverter 207, in response to the command currents. A comparator 235 compares the current command values and the actually measured values. and a known PWM (pulse width modulation) control device 236 controls the transistors of the inverter 7 in accordance with the outputs of the comparator. Further, numeral 237 indicates a preset voltage command value, numeral 238 a comparator. and numeral 239 a transistor base driving circuit.

With the above construction, when the cage 11 of the elevator is to start, the compensation element 16 qenerates a power running torque command. In this case, therefore, the cage is operated by the known control device. In contrast, when the cage enters a slowdown mode, a braking torque command is provided from the compensation element 16, so that the absolute value of the current corresponding to the torque command is output from the current value command circuit 232, and that the necessary frequency command based on the rotational frequency of the motor is output from the frequency command circuit 231. Accordingly, the current command synthesis circuit 233 synthesizes them and outputs the command values of the outputs currents of the inverter 7 (currents to flow to the motor 8). The values and the actual currents are compared, and the PWM device 236 controls the transistors of the inverter 7 so as to feed currents close to the command values.

Meanwhile, in this embodiment, regenerative power is fed back. When the electric power is fed back to the D-C side, a D-C side voltage rises. This D-C side voltage is compared with the predetermined D-C side voltage command value 237 bv the comparator 238. In a case where the D-C side voltage is higher, the transistor 6 is turned "on" through the transistor base driving circuit 239 so as to consume the regenerative power bv means of the resistor 5.

As described above according to the embodiment of this invention in FIG. 1, in the case where the braking torque is required as in the slowdown mode of the elevator, the regenerative power within the range within which the production of heat by the motor is allowable is consumed in the motor, and the excess regenerative power is consumed by the regeneration resistor, so that the apparatus can be made smaller in size.

Figure 4:
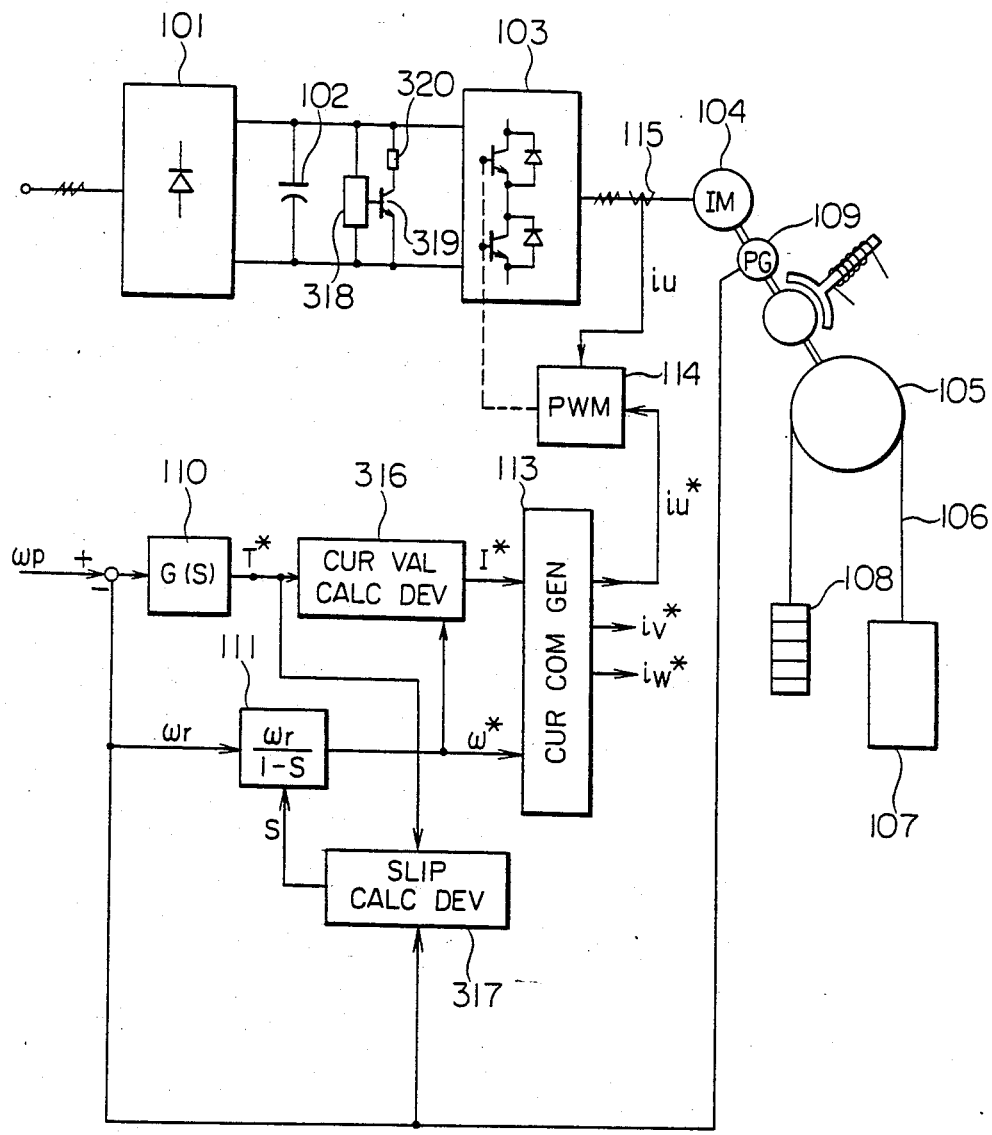
FIG. 4 is a block diagram showing another embodiment of this invention.
Figure 7:
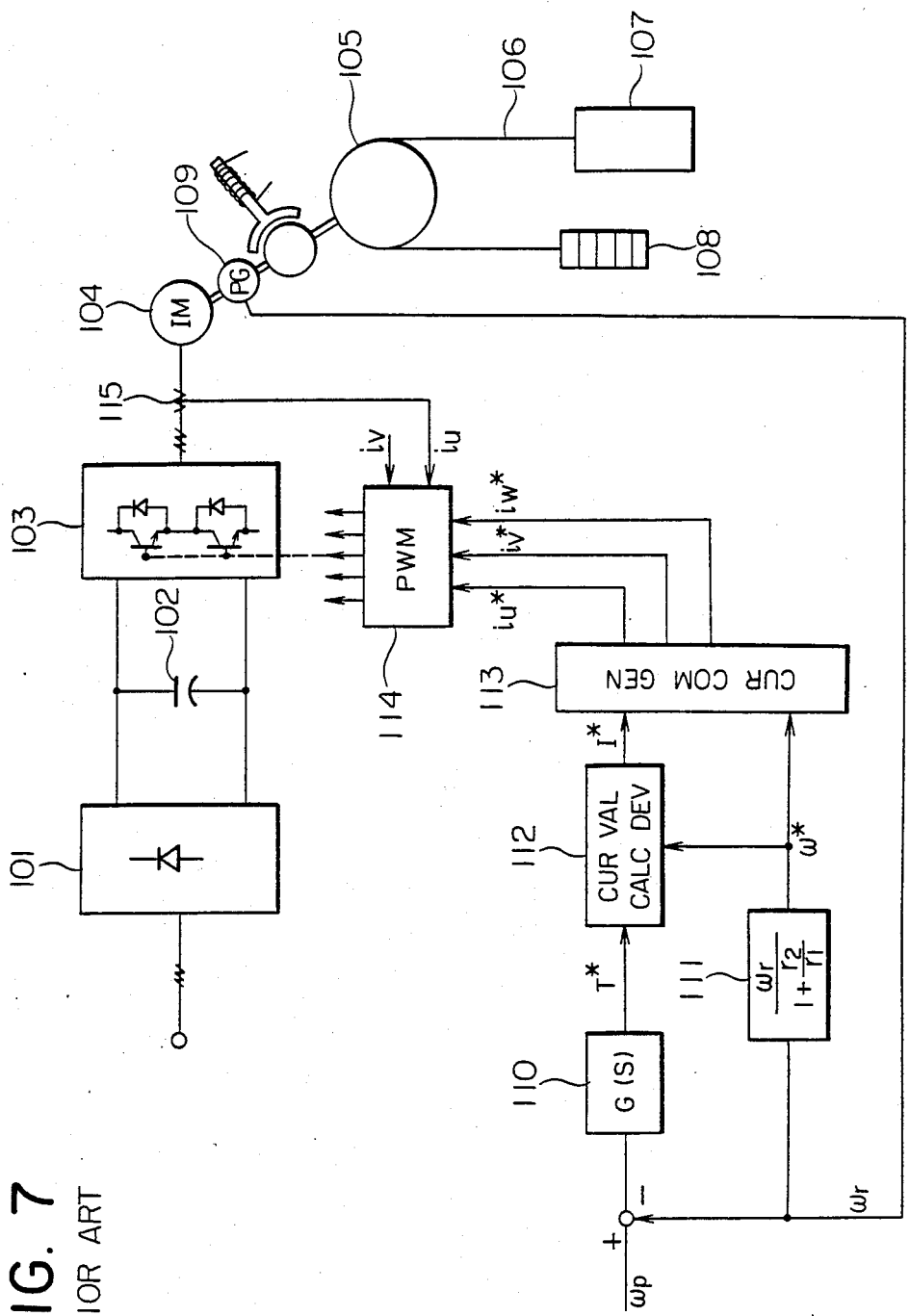
FIG. 7 is a block diagram of a prior-art example.
Figure 8:
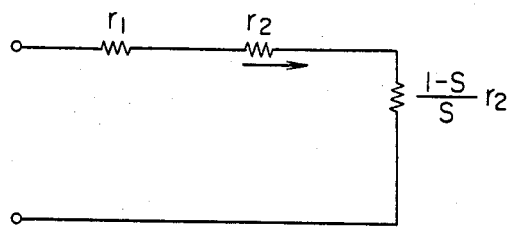
FIG. 8 is a diagram of the internal equivalent circuit of a motor.

Next, another embodiment of this invention will be described with reference to FIG. 4 in which the same portions as in FIG. 7 are assigned identical symbols. Referring to FIG. 4, numeral 316 indicates a current value calculation device for calculating a required current from a torque command, which is similar to that of the prior art but which holds a fixed current value when the torque command has exceeded a predetermined value. In addition, numeral 317 indicates a slip calculation device which outputs a fixed slip value as in the prior art when the torque command T* is within the predetermined value, and which calculates the slip S becoming as follows in accordance with Eq. (7), and outputs the calculated slip when the torque command T* has exceeded the predetermined value:

$$S = \frac{r_2 I_{max}^2}{\omega_r T^* + r_2 I_{max}^2} \quad (9)$$

Here, $I_{max}$ denotes the fixed current command value provided when the torque command has exceeded the predetermined value. Since the torque command T* in Eq. (9) assumes a minus value, the slip S evaluated with this equation assumes a minus value. When the absolute value of the torque command T* becomes large, the absolute value of the slip S becomes small, and part of the regenerative power is returned to the D-C side.

Further, numeral 318 designates a voltage detector circuit which turns "on" a transistor 319 so as to consume the regenerative power in a resistor 320 when the D-C side voltage has risen due to the return of the regenerative power to the D-C side.

In the above construction, accordingly, while the braking torque command T* is small, the output of the slip calculation device 317 is put into $$S = -\frac{r_2}{r_1},$$

and the frequency calculation device 111 calculates $$\omega^* = \frac{\omega_r}{1 + \frac{r_2}{r_1}}$$

and delivers it to the current command generator 113. Besides, the current value calculation device 316 calculates the current I* satisfying Eq. (8) and similarly delivers it to the current command generator 113.

On the other hand, when the braking torque T* has increased, the slip calculation device 317 calculates and outputs the slip S satisfying Eq. (9), and the output of the current value calculation device 316 is fixed to the predetermined value $I_{max}$. Thus, the regenerative power is partly fed back to the D-C side. Therefore, the voltage on the D-C side rises, the transistor 319 is turned "on" by the voltage detector circuit 318, and current flows through the transistor 320 to consume the power therein.

Figure 9:
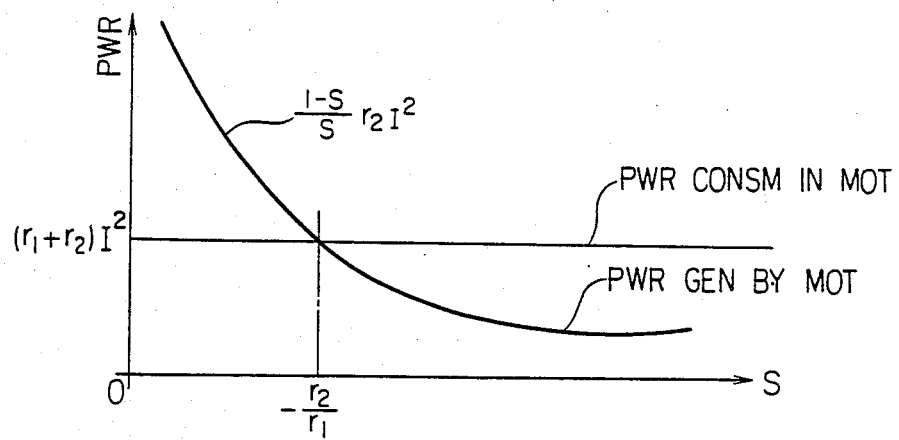
FIG. 9 is a diagram of the characteristics of the generated power and consumed power versus the slip of the motor.

In the embodiment, the slip for the torque command within the predetermined value is set at the value $(-r_2/r_1)$ at which the regenerative power is fully consumed within the motor. Since, however, the regenerative power consumption device is originally disposed on the D-C side, this value may well be a still smaller value in terms of an absolute value, namely, a value on the left side of $$S = -\frac{r_2}{r_1}$$

in FIG. 9, and it can be selected to the optimum value in consideration of the heat generation of the motor and the limitation of an inverter capacity.

For the sake of brevity, the present embodiment has been described using the simplified equivalent circuit of the single phase. When the various quantities are computed using a more detailed equivalent circuit, a preciser control is performed, but the control is essentially the same as in the foregoing.

As described above, according to the embodiment of this invention in FIG. 4, when the braking torque command is not greater than the predetermined value, the slip is fixed and only the magnitude of the current is controlled, and when the braking torque command has exceeded the predetermined value, the slip is reduced without increasing the magnitude of the current, thereby to control the braking torque. Therefore, the regenerative power is partly returned to the D-C side, but the current is confined within a predetermined value, so that the current capacity of the inverter can be suppressed and that the capacity of the resistor for consuming the regenerative power on the D-C side does not increase considerably. Moreover, since the electric power to be consumed within the motor decreases, the heat generation of the motor can be suppressed. Thus, a system with a thermal balance considered as a whole can be constructed.

What is claimed is:

1. In an elevator having an inverter to which a D-C power source is connected and which inverts D-C power into A-C power of variable voltage and variable frequency, an induction motor which is driven by the inverted A-C power so as to run a cage of the elevator, and a regenerative power consumption device which is connected to the D-C power source, an apparatus for controlling the elevator comprising first means for controlling a power running torque of the motor in accordance with a torque command signal corresponding to a deviation between a speed command signal and a speed signal of the motor, second means for fixing a slip of the motor to a predetermined value in accordance with the torque command signal and for controlling frequencies and magnitudes of primary voltages or primary currents, thereby to control a braking torque, said second means including means for setting the value of the slip on the basis of a quantity of heat generation allowed for heat generation ascribable to regenerative power consumption within said motor so as to prevent the allowable quantity of heat generation from being exceeded, a change-over device which operates to use the first means when the torque command signal is plus and which changes-over the first means to the second means when the torque command signal has become minus and means for detecting regenerative power not consumed within said motor and operating said regenerative power consumption device to consume said regenerative power.

2. In an elevator having an inverter to which a D-C power source is connected and which inverts D-C power into A-C power of variable voltage and variable frequency and an induction motor which is driven by the inverter A-C power so as to run a cage of the elevator, an apparatus for controlling the elevator comprising a speed control calculation device which outputs a torque command on the basis of a difference between an angular velocity command and an actual rotational angular velocity of the motor, a slip calculation device which receives the actual rotational angular velocity and calculates a slip value corresponding to the torque command value, a frequency calculation device which delivers a frequency command on the basis of the actual rotational angular velocity and the slip value, a current value calculation device which calculates a current command on the basis of the torque command, a current command generator which generates current commands of respective phases on the basis of the aforementioned current command and the frequency command, and a pulse width modulation switching circuit which compares the current commands of the respective phases with actual current values and controls the inverter device wherein when said motor is to generate a braking torque smaller than a predetermined value, a slip value with which regenerative power is consumed within said motor is fixed, whereupon current is controlled to control the braking torque, and when said motor is to generate a braking torque greater than the predetermined value, a magnitude of the current is fixed, whereupon the slip value is controlled to control the braking torque.

3. A control apparatus for an elevator as defined in claim 2 wherein when the braking torque value is smaller than the predetermined value, said slip calculation device delivers as the fixed slip value S a command value which is expressed by:

$$S = -\frac{r_2}{r_1}$$

where $r_1$ denotes a primary resistance of said motor, and $r_2$ a secondary resistance thereof, and when the braking torque value has become greater than the predetermined value, it delivers as the slip S a command value which is expressed by:

$$S = \frac{r_2 I_{max}^2}{\omega_r T^* + r_2 I_{max}^2}$$

where $I_{max}$ denotes a fixed current command value, $T^*$ the torque command value, $\omega_r$ the actual angular velocity, $r_1$ the primary resistance of said motor, and $r_2$ the secondary resistance of said motor.

* * * * *